(12) United States Patent
Hensley

(10) Patent No.: US 8,196,945 B2
(45) Date of Patent: Jun. 12, 2012

(54) BICYCLE PEDAL WITH INTEGRATED CABLE LOCK

(75) Inventor: Ryan G. Hensley, Sandy State, UT (US)

(73) Assignee: Pedal Lock Partnership, Sugar Land, TX (US)

( * ) Notice: Subject to any disclaimer, the term of this patent is extended or adjusted under 35 U.S.C. 154(b) by 0 days.

(21) Appl. No.: 13/163,880

(22) Filed: Jun. 20, 2011

(65) Prior Publication Data

US 2011/0309597 A1 Dec. 22, 2011

Related U.S. Application Data

(60) Provisional application No. 61/357,253, filed on Jun. 22, 2010.

(51) Int. Cl.
*B62M 1/02* (2006.01)
(52) U.S. Cl. ............ 280/259; 74/594.1; 70/233
(58) Field of Classification Search .......... 280/259, 280/288.4; 70/233, 227, 41, 53, 49, 236; 74/594.1, 594.4, 594.6, 594.7
See application file for complete search history.

(56) References Cited

U.S. PATENT DOCUMENTS

| 609,127 | A | * | 8/1898 | Stearns | 70/236 |
| 3,009,348 | A | * | 11/1961 | Colbert et al. | 70/227 |
| 4,028,916 | A | * | 6/1977 | Pender | 70/233 |
| 4,086,795 | A | * | 5/1978 | Foster et al. | 70/233 |
| 4,379,566 | A | * | 4/1983 | Titcomb | 280/251 |
| 4,783,979 | A | * | 11/1988 | Weiss | 70/233 |
| 5,291,765 | A | * | 3/1994 | Hoisington | 70/233 |
| 5,937,678 | A | * | 8/1999 | Kuo | 70/18 |
| 7,013,754 | B2 | * | 3/2006 | Milanowski | 74/594.6 |
| 7,624,605 | B2 | * | 12/2009 | Vitali | 70/233 |
| 2007/0277569 | A1 | * | 12/2007 | Vitali | 70/233 |

* cited by examiner

*Primary Examiner* — Tashiana Adams
(74) *Attorney, Agent, or Firm* — Mark Young, PA

(57) ABSTRACT

A locking bicycle pedal includes coiled cables on spools with locking mechanisms attached to free ends. The cables may be extended from the spools. The locking mechanism may comprise a key or combination lock. The locking mechanisms attach to the pedal when not in use for locking the bicycle. A bicycle may be equipped with one or more locking pedals. Where two locking pedals are provided, the locking mechanisms of one pedal may interlock with each other and/or the locking mechanisms of the other pedal. The coil and locking mechanisms do not interfere with normal use of the bicycle.

20 Claims, 8 Drawing Sheets

BICYCLE PEDAL WITH INTEGRATED CABLE LOCK

RELATED APPLICATION

This application is a non-provisional of and claims the benefit of priority of U.S. Provisional Application 61/357,253 filed 22 Jun. 2011, the entire contents of which are incorporated herein by this reference and made a part hereof.

FIELD OF THE INVENTION

This invention relates generally to bicycles, and, more particularly, to a bicycle pedal having retractable coiled cables with mating locking ends that can be withdrawn from the pedal to lock the bicycle to a stationary structure, such as a bicycle rack, and retracted back into the pedal for storage while the bicycle is in use.

BACKGROUND

Bicycles have become increasingly popular as a healthier and environmentally friendlier mode of transport. While cycles are most popular within campus towns, many major cities are continually improving cycling infrastructure to encourage cycling.

Unfortunately, fear of bicycle theft discourages bicycle use. Many bicycle theft victims do not bother to buy a replacement. Those that do purchase a replacement, tend to substantially taper use. Combating bicycle theft, therefore, is a necessary step toward increasing the use of this sustainable form of transport A consistent finding is that most stolen bicycles, regardless of theft location, are not locked at all, locked improperly or secured using a lock that requires little effort to break or remove. Some bicycles are stolen from places that are assumed to be a safe, when in reality they are not. Others are left unattended and unlocked for short periods of time. For example, sometimes people leave their bike unlocked for just a minute or two while they run into a store, only to find their bicycle gone when they exit. While all locks can be overcome if the opportunity is present and a thief is suitably equipped, inadequate locking practices create a situation conducive for the thief. Observing more-secure locking practices would, at the very least, reduce opportunistic thefts.

A reason why many bicycle owners do not bother to lock their bicycles whenever not in use is inconvenience. Carrying a conventional chain or cable and lock can be a hassle. Even if the bicycle has a basket or saddle, the sound of a chain or cable and lock rattling around in a basket or saddle or wrapped around the frame is enough to deter many bicyclists from consistently using such devices. Removing the lock and chain or cable from a basket or saddle or unwrapping it from a frame is tedious.

Another problem in preventing theft of a bicycle is that the wheels are easily detachable from the frame, and that unless both wheels and frame are secured, wheels can easily be carried away after being detached. The most secure locking method therefore is to lock the wheels and frame to each other and to an immovable object.

However, U-locks, which are en vogue, are not sized to lock both wheels and the frame to an immovable object. A U-lock is a rigid metal ring in the shape of the letter U. The U part of the lock attaches to a crossbar section, and for this reason they are also called D-locks. To lock the bicycle, one locks it physically to some other object, such as a bike rack securely in the ground, parking meter or a flagpole. At best, a typical U-lock will lock a rear wheel and frame to an immovable object. The rear wheel is more costly than the front wheel and more difficult to remove. Thus, one wheel, such as the front wheel, is typically left vulnerable to theft when a U lock is used.

To avoid theft of an unlocked front wheel, some bicycle owners will remove it and take it with them. Obviously, that is a hassle and impractical if there is no place to store the wheel.

What is needed is a convenient lock that is integrated with a bicycle and can secure a frame and at least one wheel, preferably both wheels. The lock should be useful and in conjunction with other locks. When the bicycle is being used for transportation, the lock should be inconspicuously stored without rattling and without scratching the frame.

The invention is directed to overcoming one or more of the problems and solving one or more of the needs as set forth above.

SUMMARY OF THE INVENTION

To solve one or more of the problems set forth above, in an exemplary implementation of the invention, a locking bicycle pedal and a bicycle equipped with one or two locking bicycle pedals are provided. An exemplary bicycle pedal according to principles of the invention includes a pedal body providing a surface against which a user's foot may exert a force. A threaded spindle is rotatably coupled to the pedal body, the pedal body is rotatable relative to the spindle, the spindle is configured for threaded engagement of a crank arm of a bicycle. A first spool includes a first axle and a first sleeve, the first sleeve is rotatable relative to the first axle, and the first axle is attached to the pedal body. A first security cable is wound on the axle of the first spool, the first security cable having a first free end that can be withdrawn from the first spool. A first locking mechanism is attached to the first free end of the first security cable. A first means for releasably attaching the first locking mechanism to the pedal body is provided. The first free end and first locking mechanism of the first security cable is extendable from the first spool and retractable by winding the first security cable onto the first spool.

The exemplary bicycle pedal may also include a second spool with a second axle and a second sleeve. The second sleeve is rotatable relative to the second axle, and the second axle is attached to the pedal body, spaced apart from and parallel to the first axle. The first security cable includes a length of cable wound on the second axle of the second spool. The length of cable has a second free end that can be withdrawn from the second spool. A second locking mechanism is attached to the second free end of the security cable. A second means for releasably attaching the second locking mechanism to the pedal body is provided. The second free end and first locking mechanism of the second security cable is extendable from the second spool and retractable by winding the second security cable onto the second spool. The first locking mechanism and the second locking mechanism releasably interlock and comprise a combination lock. Each spool may be a spring retractable spool.

The spindle has a longitudinal axis. The pedal body includes a first spar and a second spar parallel to the first spar and parallel to the longitudinal axis of the spindle. The means for releasably attaching the first locking mechanism to the pedal body includes a first recess in the first spar sized and shaped to receive the first locking mechanism. The means for releasably attaching the second locking mechanism to the pedal body includes a second recess in the second spar sized and shaped to receive the second locking mechanism. Alternatively, the means for releasably attaching may be a clamp or a magnet.

In one embodiment, the coils are connected by a length of cable. In another embodiment, each coil is separate.

A bicycle may be equipped with one or two locking pedals according to principles of the invention. Each locking pedal includes a spindle configured to thread onto a crank arm attached to the drive sprocket of the bicycle.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the types of mating locking components, configurations, shapes, relative sizes, ornamental aspects or proportions shown in the figures.

DETAILED DESCRIPTION

Figure 1:
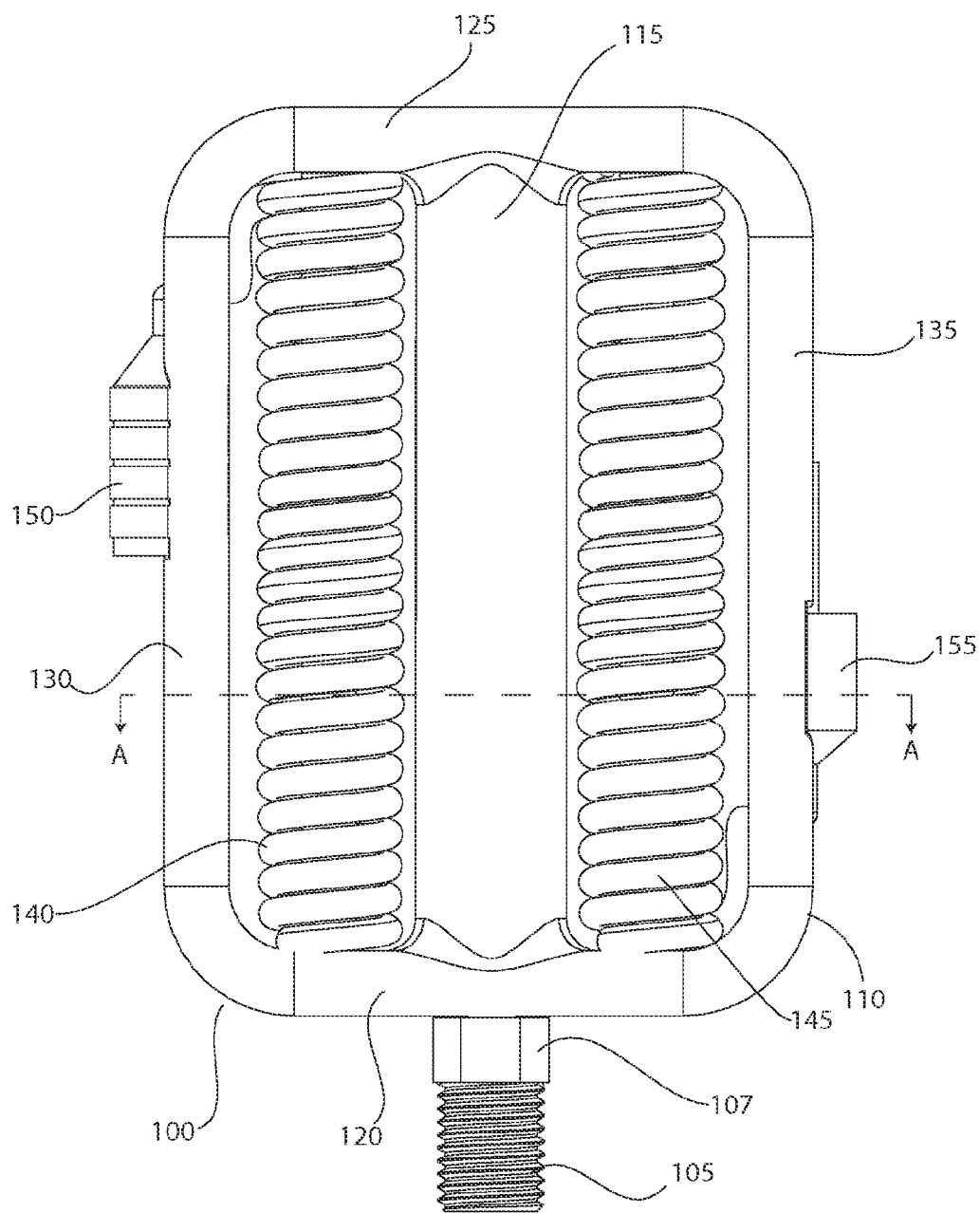
FIG. 1 is a plan view of an exemplary pedal assembly with coiled cable locks according to principles of the invention.
Figure 3:
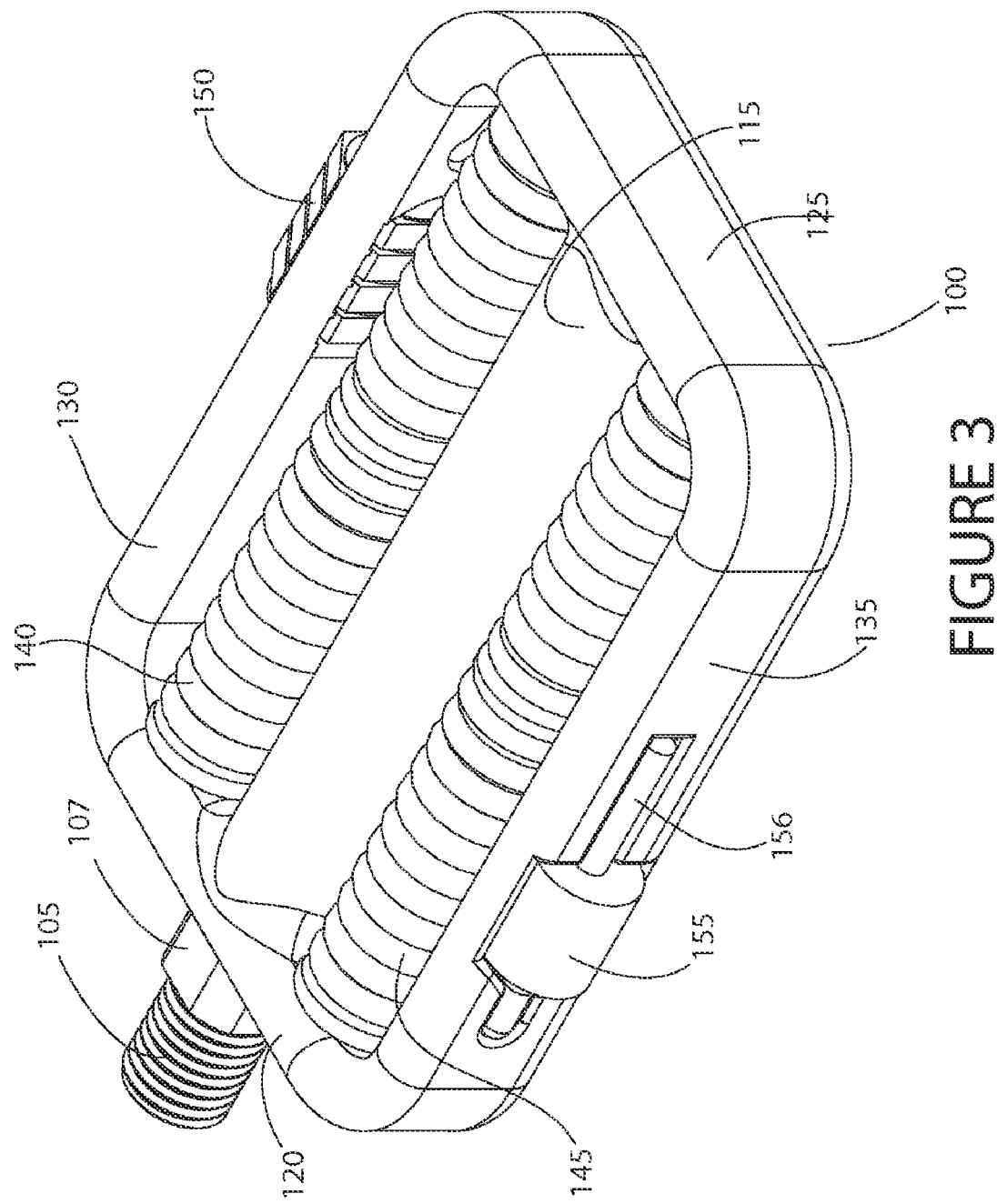
FIG. 3 is a first perspective view of an exemplary pedal assembly with coiled cable locks according to principles of the invention.
Figure 4:
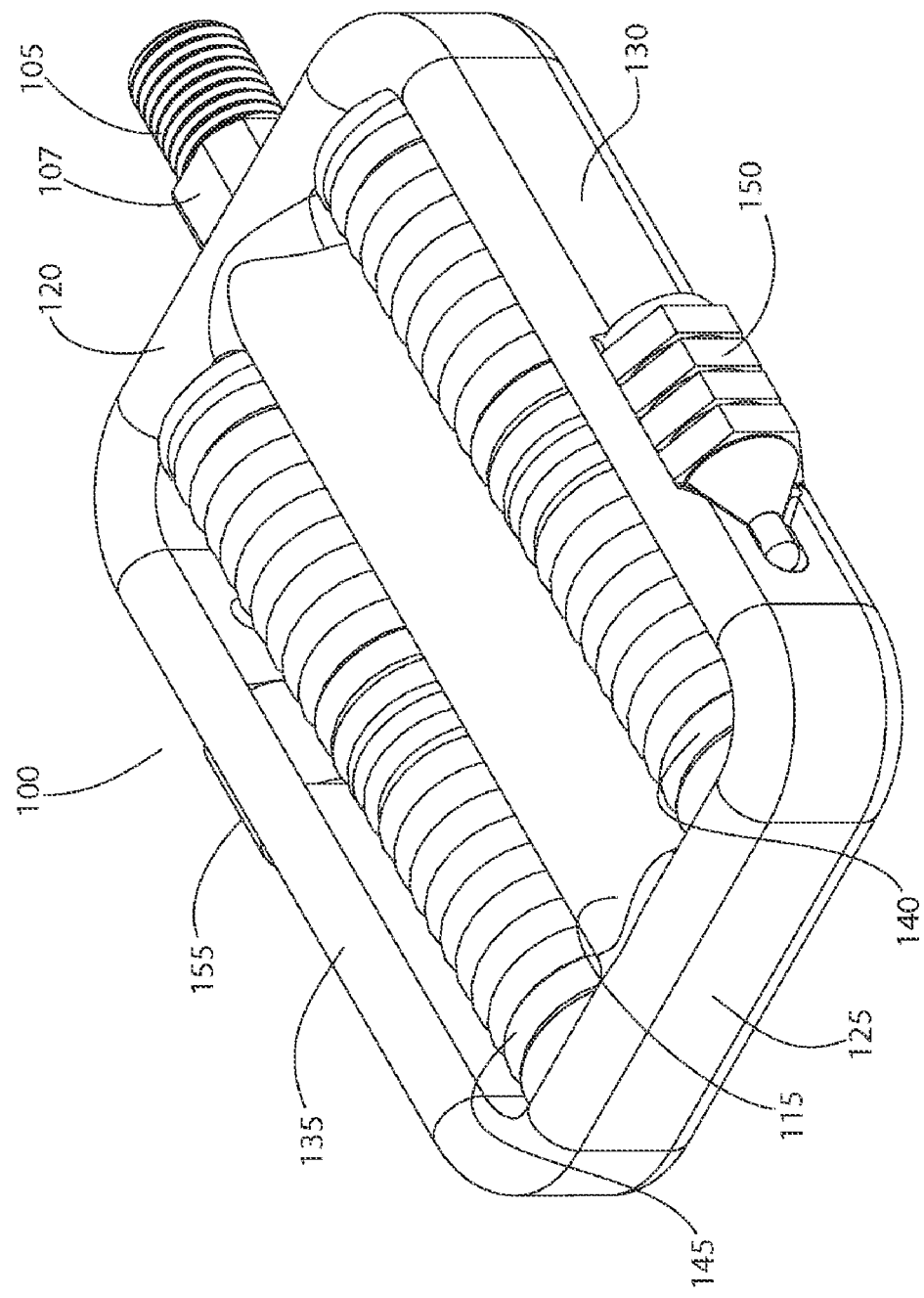
FIG. 4 is a second perspective view of an exemplary pedal assembly with coiled cable locks according to principles of the invention.
Figure 5:
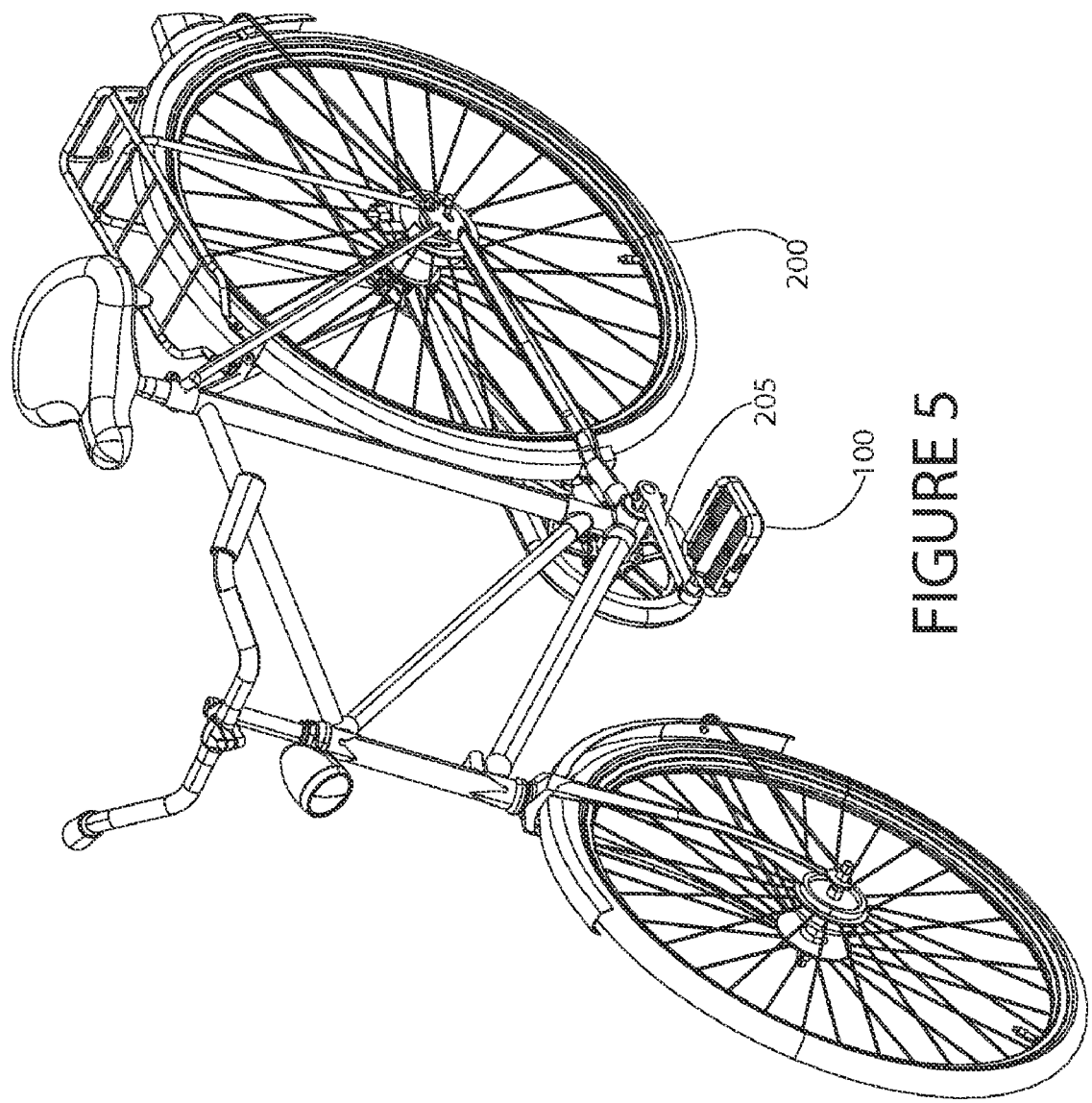
FIG. 5 is a perspective view of a bicycle equipped with an exemplary pedal assembly with coiled cable locks according to principles of the invention.

Referring to FIGS. 1, 3 and 4, a bicycle pedal 100 with an integrated cable lock according to principles of the invention is shown. The pedal 100 comprises foot-operated platform for reciprocating motion propulsion of a bicycle 200 (FIG. 5). The pedal 100 provides the connection between the cyclist's foot and a crank 205, allowing a cyclist to turn an axle and propel the bicycle's wheels.

The exemplary pedal 100 is comprised of a threaded spindle 105 that threads into the end of the crank and a body 110, on which the foot rests. A head 107 attached to the spindle 105 is configured with one or more substantially flat sides suitable for engagement with a conventional open ended wrench for installation and removal. The pedal spindle 105 is threaded to match a threaded hole at the outboard end of the crank 205 (FIG. 5) of a bicycle. For example, in the U.S., adult or multi-piece cranks typically have a 9/16-inch (14.2875 mm) hole with 20 threads per inch (TPI). One-piece or children's cranks in the U.S. use a ½-inch (12.7 mm) by 20 TPI hole. A right-side (usually the drive-side, i.e., the side with the sprocket) pedal spindle is right-hand threaded, and the left-side (usually the non-drive-side) pedal spindle is left-hand (reverse) threaded to help prevent it from becoming loose by precession.

The body 110 of the pedal 100 is free to rotate, on bearings, relative to the spindle 105. The body 110 is a generally rectangular shaped framework with a central axle 115. The central axle 115 is rotatably coupled to the spindle 105, which threadedly attaches to the bicycle crank arm 205. The body 110 includes inboard and outboard ribs 120, 125 extending from the axle 115 to which parallel front and rear spars 130, 135 are attached. The ribs 120, 125, spars 130, 135 and axle may be integrally formed from two or more separate components that are attached together to form the body 110 of the pedal 100.

Figure 2:
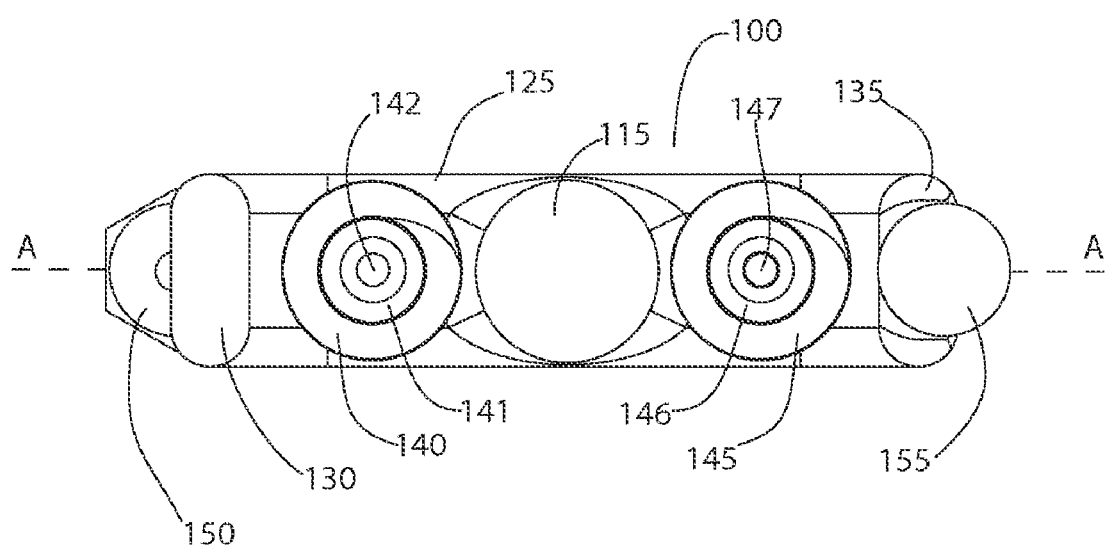
FIG. 2 is a side section view of an exemplary pedal assembly with coiled cable locks according to principles of the invention.

Unlike conventional pedals, a pedal according to principles of the invention includes a pair of spools as shown in the section view of FIG. 2. Each spool comprises a sleeve 141, 146 over a fixed axle 142, 147. The sleeve 141, 146 is free to rotate about the axle 142, 147. The spools extend between the inboard and outboard ribs 120, 125 of the body 110 of the pedal 100. One spool is between the front spar 130 of the pedal 100 and the central axle 115, and the other spool is between the rear spar 135 of the pedal 100 and the central axle 115. Each spool is parallel to the axle 115. Coiled cable 140, 145 is wound on each spool. A free end of each coiled cable includes a locking mechanism 150, 155. Each spool may be spring rewindable. Alternatively, each spool may rewind under the recoiling influence of the cable. As another alternative, the spool may be manually rewindable.

The coils may be connected or separate. In one embodiment, the coils of cable on a pedal are integrally connected. In such an embodiment a length of cable extends from one coil to the other coil. The cable may extend through an aperture or channel in the axle 115.

In another embodiment, each coil is separate from the other coil. In such embodiment, one end of the coil is attached to the pedal 100. For example, the attached end may be securely fastened to the fixed axle 142, 147 of the spool. Illustratively, the attached end may comprise a crimped loop through which the fixed axle 142, 147 extends.

One pedal or both pedals of a bicycle may be equipped with the coiled cable locking mechanism as described above. In an embodiment where only one pedal is equipped with the coiled cable locking mechanism, one locking mechanism 150 of the pedal 100 may connect with the mating locking mechanism 155 of the pedal.

Figure 6:
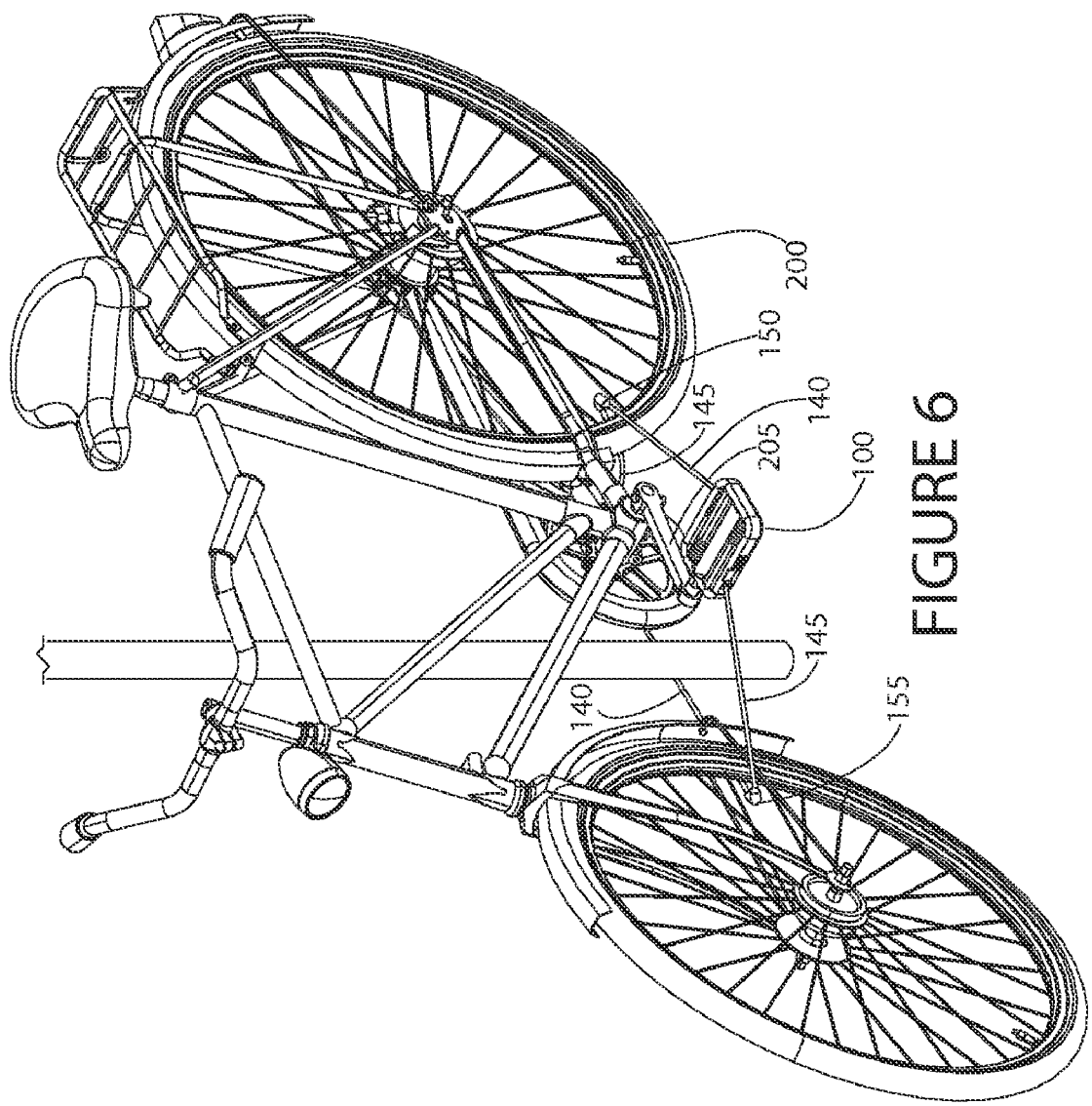
FIG. 6 is a perspective view of a locked bicycle equipped with an exemplary pedal assembly with coiled cable locks in a locked configuration according to principles of the invention.

In an embodiment where both pedals are equipped, the locking mechanisms 150, 155 of each pedal 100 may connect with the mating locking mechanisms 150, 155 of the other pedal, as conceptually illustrated in FIG. 6. Two coiled segments of cable are provided on the left pedal and two coiled segments are provided on the right pedal. In such an embodiment, each coiled cable comprises a fraction (e.g., $\frac{1}{4}^{th}$) of the total length of locking cable available. In the aggregate, sufficient total length of locking cable is available to lock the frame and both wheels to a structure as shown in FIG. 6.

The coiled cables comprise a cable lock. The free end of each coiled cable includes a locking mechanism or a loop formed of the cable and through which a locking mechanism may be coupled. The composition of the cable is not particularly important, provided that it is capable of being coiled and suitable for use for bicycle security. As an example, the coiled cable may be comprised of a vinyl covered spring steel cable that automatically coils itself when released. The vinyl cover is optional. As another option, one or more overlapping steel jackets may be threaded over the cable beneath or in lieu of the vinyl covering to protect the central cable.

Figure 8:
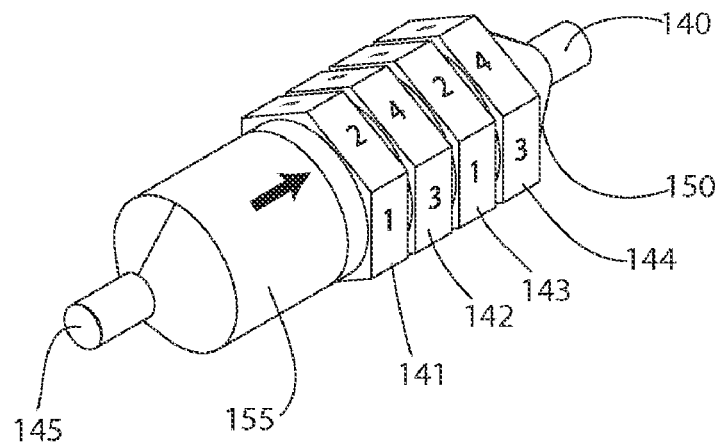
FIG. 8 is a perspective view of exemplary locking mechanism in mating or engaged configuration.
Figure 9:
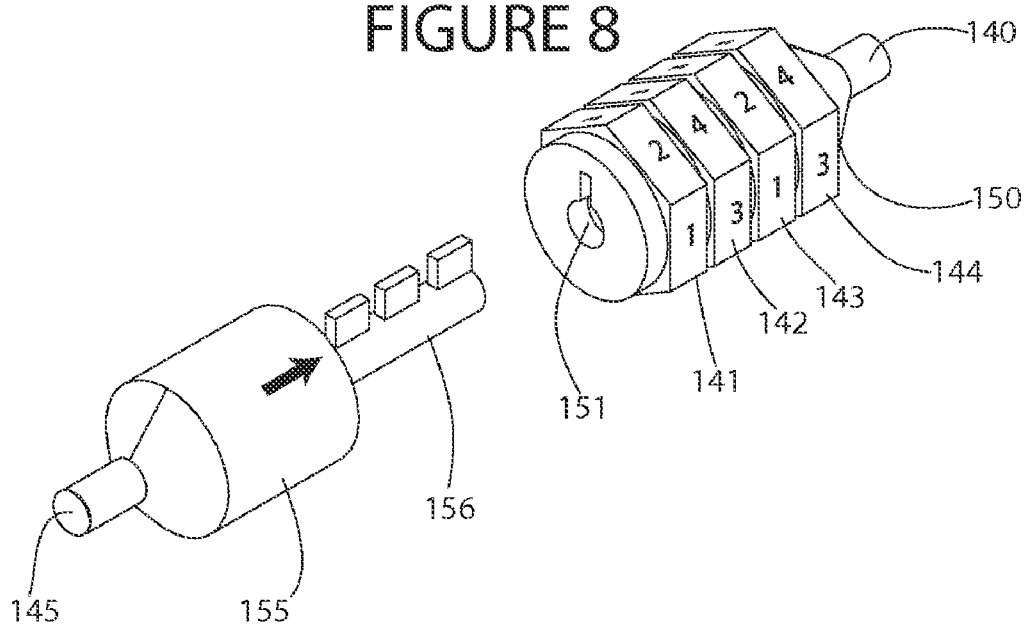
FIG. 9 is a perspective view of exemplary locking mechanism in separated or disengaged configuration.

The particular type of locking mechanism is not particularly important, provided that it is compatible with use on a pedal 100. One exemplary lock includes a female locking mechanism 150 comprising a barrel with several rotating sections or discs 141, 142, 143, 144 with a notch cut into the center of each disc, as shown in FIGS. 8 and 9. The notches are configured (i.e., shaped and sized) to receive a key shaped pin 156. The female locking mechanism 150 receives the key-shaped pin 156 of the male mechanism 155. The key-shaped pin 156 has several teeth on it which hook into the rotating discs. When the notches in the discs 141-144 align with the teeth on the pin 156, the lock can be opened. The shape and size of this type of locking mechanism is advantageous for use with a pedal according to principles of the invention, because the male and female locking mechanisms are small enough in width and length to attach to the pedal (e.g., the front and rear spars) without protruding above or below the pedal.

The front and rear spars of the pedal body include features to accommodate the cable and locking mechanisms. An aperture is provided in each spar through which the cable may be extended and retracted. A means for holding the locking mechanism securely to the pedal body is also provided. The holder must secure the locking mechanism in a position and manner that does not interfere with use. The holder may comprise a form-fit recess into which the locking mechanism is retracted and held. In addition to or in lieu of the recess, mechanical or magnetic attaching mechanisms may be used to secure the locking mechanism to a spar or other component of the pedal.

Figure 7:
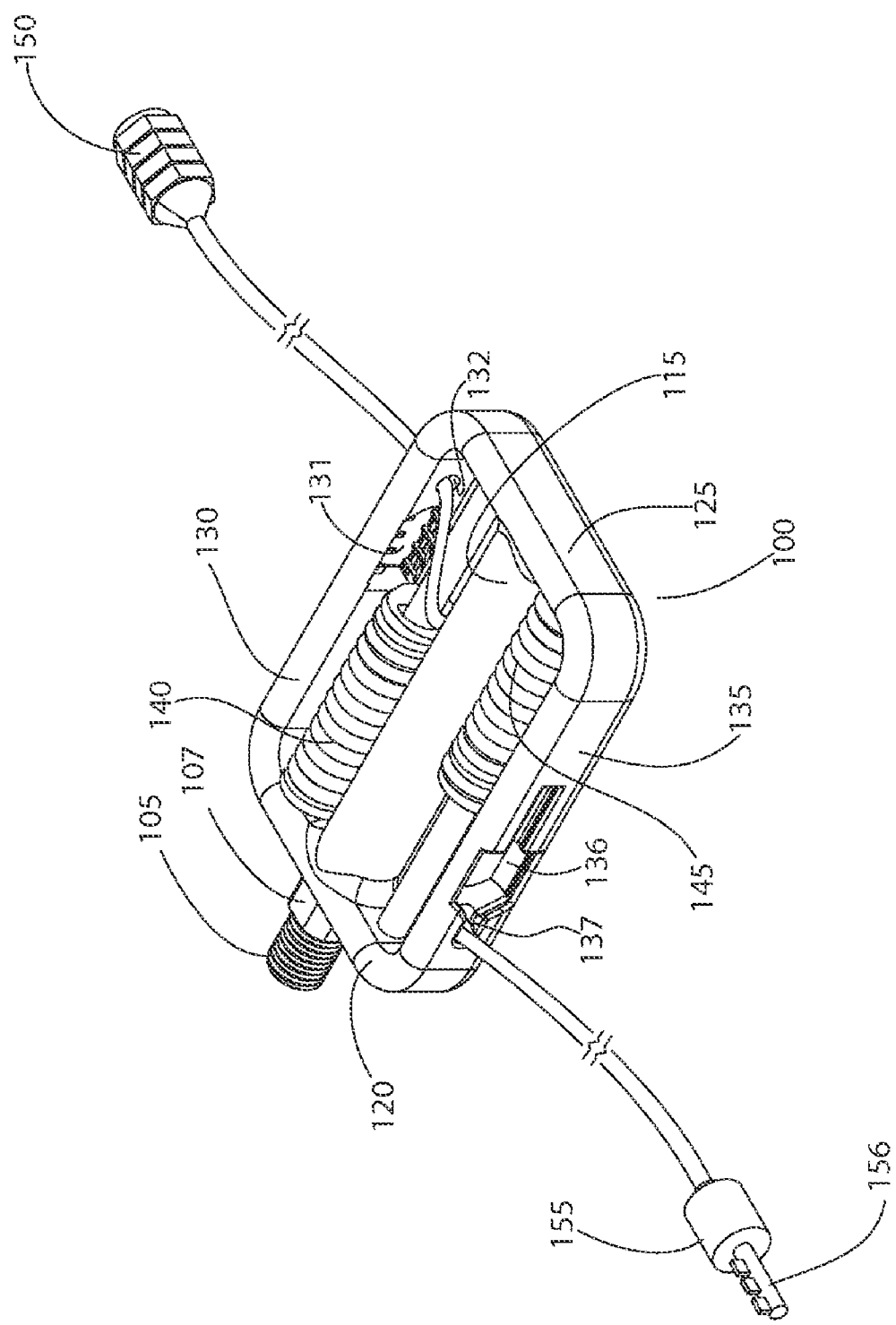
FIG. 7 is a first perspective view of an exemplary pedal assembly with partially extended coiled cable locks according to principles of the invention.

Referring now to FIG. 7, the pedal 100 according to FIGS. 1, 3 and 4 is shown with the cables 140, 145 partially extended. Means for attaching the female and male locking mechanisms 150, 155 to the spars 130, 135 are provided. In the embodiment shown in FIG. 7, the means comprise recesses 131, 136 in the spars 130, 135. Each recess 131, 136 is shaped and sized to receive all or part of the corresponding locking mechanism 150, 155. Optionally, the recess may include a resilient catch to resist unintended withdrawal of the locking mechanism. The locking mechanism may also be coated in whole or in part with a resilient coating (e.g., vinyl) that ensures a snug fit in the recess. Alternative means for attaching include mechanical clamps and/or magnets. Thus for example a spring clamp may be provided in lieu of or in addition to the recess. As another example, the locking mechanism and/or pedal may be equipped with a permanent magnet that attracts a magnet or ferrous material of the other item.

The locking cable extends through a channel or aperture 132, 137 in each spar 130, 135. The aperture 132, 137 has a diameter that is greater than the diameter of the cable 140, 145. The aperture 132, 137 may be integrally formed with the recess 131, 136 or separate from the recess.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A bicycle pedal comprising:
a pedal body providing a surface against which a user's foot may exert a force;
a threaded spindle rotatably coupled to the pedal body, the pedal body being rotatable relative to the spindle, the spindle being configured for threaded engagement of a crank arm of a bicycle;
a first spool comprising a first axle and a first sleeve, said first sleeve being rotatable relative to the first axle, and said first axle being attached to the pedal body;
a first security cable wound on the axle of the first spool, the first security cable having a first free end that can be withdrawn from the first spool;
a first locking mechanism attached to the first free end of the first security cable; and
a first means for releasably attaching the first locking mechanism to the pedal body; and
the first free end and first locking mechanism of the first security cable being extendable from said first spool and retractable by winding the first security cable onto said first spool.

2. A bicycle pedal according to claim 1 further comprising:
a second spool comprising a second axle and a second sleeve, said second sleeve being rotatable relative to the second axle, and said second axle being attached to the pedal body, spaced apart from and parallel to the first axle;
the first security cable including a length of cable wound on the second axle of the second spool, the length of cable having a second free end that can be withdrawn from the second spool;
a second locking mechanism attached to the second free end of the security cable; and
a second means for releasably attaching the second locking mechanism to the pedal body; and
the second free end and first locking mechanism of the second security cable being extendable from said second spool and retractable by winding the second security cable onto said second spool.

3. A bicycle pedal according to claim 2 wherein the first locking mechanism and the second locking mechanism releasably interlock and comprise a combination lock.

4. A bicycle pedal according to claim 2 wherein the first spool is a first spring retractable spool and the second spool is a second spring retractable spool.

5. A bicycle pedal according to claim 2, said spindle having a longitudinal axis, said pedal body comprising a first spar and a second spar parallel to said first spar and parallel to the longitudinal axis of the spindle, said means for releasably attaching the first locking mechanism to the pedal body comprising a first recess in the first spar sized and shaped to receive the first locking mechanism, and said means for releasably attaching the second locking mechanism to the pedal body comprising a second recess in the second spar sized and shaped to receive the second locking mechanism.

6. A bicycle pedal according to claim 2, said spindle having a longitudinal axis, said pedal body comprising a first spar and a second spar parallel to said first spar and parallel to the longitudinal axis of the spindle, said means for releasably attaching the first locking mechanism to the pedal body comprising a first clamp on the first spar configured to receive the first locking mechanism, and said means for releasably attaching the second locking mechanism to the pedal body comprising a second clamp on the second spar configured to receive the second locking mechanism.

7. A bicycle pedal according to claim 2, said spindle having a longitudinal axis, said pedal body comprising a first spar and a second spar parallel to said first spar and parallel to the longitudinal axis of the spindle, said means for releasably attaching the first locking mechanism to the pedal body comprising a first magnet on the first spar configured to magnetically releasably secure the first locking mechanism, and said means for releasably attaching the second locking mechanism to the pedal body comprising a second magnet on the second spar configured to magnetically releasably secure the second locking mechanism.

8. A bicycle pedal according to claim 1 further comprising:
   a second spool comprising a second axle and a second sleeve, said second sleeve being rotatable relative to the second axle, and said second axle being attached to the pedal body, spaced apart from and parallel to the first axle;
   a second security cable wound on the second axle of the second spool, the second security cable having a second free end that can be withdrawn from the second spool;
   a second locking mechanism attached to the second free end of the security cable; and
   a second means for releasably attaching the second locking mechanism to the pedal body.

9. A bicycle pedal according to claim 8 wherein the first locking mechanism and the second locking mechanism releasably interlock and comprise a combination lock.

10. A bicycle pedal according to claim 8 wherein the first spool is a first spring retractable spool and the second spool is a second spring retractable spool.

11. A bicycle pedal according to claim 8, said spindle having a longitudinal axis, said pedal body comprising a first spar and a second spar parallel to said first spar and parallel to the longitudinal axis of the spindle, said means for releasably attaching the first locking mechanism to the pedal body comprising a first recess in the first spar sized and shaped to receive the first locking mechanism, and said means for releasably attaching the second locking mechanism to the pedal body comprising a second recess in the second spar sized and shaped to receive the second locking mechanism.

12. A bicycle pedal according to claim 8, said spindle having a longitudinal axis, said pedal body comprising a first spar and a second spar parallel to said first spar and parallel to the longitudinal axis of the spindle, said means for releasably attaching the first locking mechanism to the pedal body comprising a first clamp on the first spar configured to receive the first locking mechanism, and said means for releasably attaching the second locking mechanism to the pedal body comprising a second clamp on the second spar configured to receive the second locking mechanism.

13. A bicycle pedal according to claim 8, said spindle having a longitudinal axis, said pedal body comprising a first spar and a second spar parallel to said first spar and parallel to the longitudinal axis of the spindle, said means for releasably attaching the first locking mechanism to the pedal body comprising a first magnet on the first spar configured to magnetically releasably secure the first locking mechanism, and said means for releasably attaching the second locking mechanism to the pedal body comprising a second magnet on the second spar configured to magnetically releasably secure the second locking mechanism.

14. A bicycle equipped with a first locking pedal, said bicycle including a sprocket and pair of crank arms extending from the sprocket, said first locking pedal being rotatably attached to one of the pair of crank arms;
   the first locking pedal comprising:
      a first pedal body providing a surface against which a user's foot may exert a force;
      a first threaded spindle rotatably coupled to the first pedal body, the first pedal body being rotatable relative to the first threaded spindle, the first threaded spindle being configured for threaded engagement of the crank arm of the bicycle;
      a first spool comprising a first axle and a first sleeve, said first sleeve being rotatable relative to the first axle, and said first axle being attached to the first pedal body;
      a first security cable wound on the axle of the first spool, the first security cable having a first free end that can be withdrawn from the first spool;
      a first locking mechanism attached to the first free end of the first security cable; and
      a first means for releasably attaching the first locking mechanism to the pedal body; and
      the first free end and first locking mechanism of the first security cable being extendable from said first spool and retractable by winding the first security cable onto said first spool.

15. A bicycle equipped with a first locking pedal according to claim 14, said first locking pedal further comprising:
   a second spool comprising a second axle and a second sleeve, said second sleeve being rotatable relative to the second axle, and said second axle being attached to the first pedal body, spaced apart from and parallel to the first axle;
   the first security cable including a length of cable wound on the second axle of the second spool, the length of cable having a second free end that can be withdrawn from the second spool;
   a second locking mechanism attached to the second free end of the security cable; and
   a second means for releasably attaching the second locking mechanism to the first pedal body; and
   the second free end and first locking mechanism of the second security cable being extendable from said second spool and retractable by winding the second security cable onto said second spool;
   wherein the first locking mechanism and the second locking mechanism releasably interlock and comprise a combination lock.

16. A bicycle equipped with a first locking pedal according to claim 15, wherein the first spool is a first spring retractable spool and the second spool is a second spring retractable spool.

17. A bicycle equipped with a first locking pedal according to claim 15, said first spindle having a longitudinal axis, said first pedal body comprising a first spar and a second spar parallel to said first spar and parallel to the longitudinal axis of the spindle, said means for releasably attaching the first locking mechanism to the first pedal body comprising a first recess in the first spar sized and shaped to receive the first locking mechanism, and said means for releasably attaching the second locking mechanism to the pedal body comprising a second recess in the second spar sized and shaped to receive the second locking mechanism.

18. A bicycle equipped with a first locking pedal according to claim 15, said first spindle having a longitudinal axis, said first pedal body comprising a first spar and a second spar parallel to said first spar and parallel to the longitudinal axis of the first spindle, said means for releasably attaching the first locking mechanism to the first pedal body comprising a first clamp on the first spar configured to receive the first locking mechanism, and said means for releasably attaching the second locking mechanism to the first pedal body comprising a second clamp on the second spar configured to receive the second locking mechanism.

19. A bicycle equipped with a first locking pedal according to claim 15, said first spindle having a longitudinal axis, said first pedal body comprising a first spar and a second spar parallel to said first spar and parallel to the longitudinal axis of the spindle, said means for releasably attaching the first locking mechanism to the first pedal body comprising a first magnet on the first spar configured to magnetically releasably secure the first locking mechanism, and said means for releasably attaching the second locking mechanism to the pedal body comprising a second magnet on the second spar configured to magnetically releasably secure the second locking mechanism.

20. A bicycle equipped with a first locking pedal according to claim 15, further comprising a second locking pedal being rotatably attached to the other of the pair of crank arms, said second locking pedal being the same as the first locking pedal except that the first spindle of the first locking pedal is configured to engage one of the pair of crank arms and the second locking pedal has a second spindle configured to engage the other of the pair of crank arms.

* * * * *